(12) United States Patent
Wang

(10) Patent No.: US 8,893,859 B2
(45) Date of Patent: Nov. 25, 2014

(54) HYDRAULIC BRAKE CONTROLLER

(75) Inventor: Chun-Chin Wang, Taoyuan County (TW)

(73) Assignee: Heng Tong Machinery Co., Ltd., Taoyuan County (TW)

(*) Notice: Subject to any disclaimer, the term of this patent is extended or adjusted under 35 U.S.C. 154(b) by 556 days.

(21) Appl. No.: 12/964,783

(22) Filed: Dec. 10, 2010

(65) Prior Publication Data

US 2012/0145497 A1 Jun. 14, 2012

(51) Int. Cl.
*B62L 3/00* (2006.01)
*B60T 11/16* (2006.01)
*B60T 7/10* (2006.01)
*B60T 11/18* (2006.01)

(52) U.S. Cl.
CPC .......... *B60T 11/16* (2013.01); *B60T 7/102* (2013.01); *B60T 11/18* (2013.01)
USPC .......... 188/24.22; 188/344; 188/352; 60/583; 60/585

(58) Field of Classification Search
CPC .......... B60T 11/16; B60T 11/18; B60T 7/102
USPC ......... 188/24.22, 344, 353; 60/583, 585, 588, 60/591
See application file for complete search history.

(56) References Cited

U.S. PATENT DOCUMENTS

| | | | | |
|---|---|---|---|---|
| 2,757,512 | A * | 8/1956 | Foreman | 60/548 |
| 4,162,616 | A * | 7/1979 | Hayashida | 60/533 |
| 5,042,253 | A * | 8/1991 | Kataoka | 60/560 |
| 5,524,736 | A * | 6/1996 | Korshak | 188/352 |
| 5,950,772 | A * | 9/1999 | Buckley et al. | 188/26 |
| 6,003,639 | A * | 12/1999 | Buckley et al. | 188/26 |
| 6,581,380 | B2 * | 6/2003 | Dangel et al. | 60/588 |
| 6,871,729 | B2 * | 3/2005 | Huster et al. | 188/24.11 |
| 7,546,909 | B2 * | 6/2009 | Campbell et al. | 188/24.22 |
| 8,146,716 | B2 * | 4/2012 | Siew et al. | 188/24.22 |
| 2005/0056508 | A1* | 3/2005 | Laghi | 188/344 |
| 2007/0051575 | A1* | 3/2007 | Lumpkin | 188/344 |
| 2007/0215416 | A1* | 9/2007 | Chen | 188/24.22 |
| 2007/0215417 | A1* | 9/2007 | Chen | 188/24.22 |
| 2008/0302101 | A1* | 12/2008 | Dunlap | 60/594 |
| 2009/0000878 | A1* | 1/2009 | Lumpkin | 188/24.22 |
| 2010/0064838 | A1* | 3/2010 | Siew et al. | 74/491 |
| 2012/0067043 | A1* | 3/2012 | Becocci et al. | 60/585 |
| 2012/0096850 | A1* | 4/2012 | Dunlap et al. | 60/585 |

* cited by examiner

*Primary Examiner* — Robert A Siconolfi
*Assistant Examiner* — Charles Poon
(74) *Attorney, Agent, or Firm* — Jackson IPG PLLC

(57) ABSTRACT

A hydraulic brake controller does not only dispose a first oil-return hole, which is connected to an oil storing space, at a stroke place of allowing a piston to reciprocate in a main oil cylinder, but also disposes a regulating screw, which stretches the first oil-return hole, on a controller main body. The speed of returning hydraulic oil to the oil storing space can be controlled by simply changing the degree of the regulating screw stretching the oil-return hole so that time of allowing the piston passing through the oil-return hole to completely impose the braking force on the brake pad can be extended or reduced, thereby achieving a goal of conveniently regulating the braking sensitivity.

8 Claims, 7 Drawing Sheets

HYDRAULIC BRAKE CONTROLLER

BACKGROUND OF THE INVENTION

1. Field of the Invention

The present invention relates to a hydraulic braking controller, and more particularly to a hydraulic braking controller that conveniently regulates the braking sensitivity.

2. Description of the Related Art

A hydraulic brake apparatus utilized in a motorcycle or a bicycle can be taken as one of hydraulic equipment that is in widespread use. A brake controller driven by a brake handlebar is disposed to a handgrip place of the hydraulic brake apparatus. In addition, a braking caliper is disposed to wheels through a hydraulic pipe. When a rider presses the brake handlebar, a piston relatively disposed in the main oil cylinder of the brake controller is driven by the brake handlebar to go forward. Hydraulic oil within the main oil cylinder is pushed into a sub-oil cylinder of the braking caliper to allow a brake pad of the sub-oil cylinder to move toward the brake disc. The brake pad is in contact with the brake disc of the hub to further brake the wheels. When the rider releases the brake handlebar, the piston in the main oil cylinder or the brake pad at the sub-oil cylinder can back off under the effect of the spring, and the brake handlebar can return to a predetermined angle.

Moreover, after performing braking motion for several times, the brake pad may be worn away (the brake pad is thinned). The reciprocation stroke of the piston must be relatively increased to achieve a desired braking effect. To avoid the brake handlebar from completely reciprocating due to the foregoing factors and to avoid influencing the braking force, an oil pot (or an oil cup) is further disposed to a normal hydraulic brake controller, and an oil-return hole connected to the oil pot is disposed to a reciprocation stroke place for the piston of the main oil cylinder.

With the state of completely backing the piston off, hydraulic oil within the oil pot is automatically filled into a hydraulic pipe in front of the piston through the oil-return hole. The brake handlebar may not return to a predetermined angle due to the abrasion of the brake pad, and the desired braking effect can be retained.

However, when a rider presses the brake handlebar to drive the piston, a portion of force generated by the brake handlebar is distributed to push additional hydraulic oil back to the oil pot before the piston does not completely pass through the oil-return hole. The force generated by the brake handlebar must be completely imposed on the brake disc after the piston completely passes through the oil-return hole. The time of allowing the piston passing through the oil-return hole or the force that is distributed by the piston may be influenced in accordance with different oil return capacity, resulting in further influencing the braking sensitivity.

Therefore, under a basis of no influencing the function of allowing the hydraulic brake controller to automatically fill with hydraulic oil, it does not only perfect the structural function of the hydraulic brake controller, but also improves the reliability of the whole brake apparatus if a design capable of conveniently regulating the braking sensitivity is further provided on the hydraulic brake controller.

SUMMARY OF THE INVENTION

In view of the shortcomings of the prior art, the inventor(s) of the present invention based on years of experience in the related industry to conduct extensive researches and experiments, and finally developed a hydraulic brake controller that conveniently regulates the braking sensitivity.

To achieve an objective, the hydraulic brake controller of the invention is to dispose an oil storing space for storing hydraulic oil, a main oil cylinder to connect a sub-oil cylinder of at least one braking caliper through a hydraulic pipe on a controller main body. A piston driven by a brake handlebar is disposed in the main oil cylinder. The characteristic of the invention is that:

The controller main body has a first oil-return hole, which is connected to the oil storing space, disposed at a stroke place of allowing the piston to reciprocate in the main oil cylinder. The controller main body further has a regulating screw capable of stretching the first oil-return hole.

After performing each braking motion, hydraulic oil is filled within the hydraulic pipe in front of the piston through the first oil-return hole. The piston stroke may not be increased due to the abrasion of the brake pad so that a brake handlebar can return to a predetermined angle, and the braking force can be retained. More specifically, the speed of returning hydraulic oil into the oil storing space by simply regulating the degree of the regulating screw stretching the first oil-return hole such that time of allowing the piston passing through the first oil-return hole to completely impose the braking force on the brake pad can be extended or reduced, thereby achieving a goal of conveniently regulating the braking sensitivity.

When the hydraulic brake controller of the invention is implemented, a spring is disposed between the piston and the main oil cylinder of the controller main body to generate an active force of allowing the piston to back off so as to achieve the reciprocation.

When the hydraulic brake controller of the invention is implemented, the oil storing space is relatively disposed to a radial position of the main oil cylinder. Alternatively, the oil storing space is relatively disposed to an axial position of the main oil cylinder. The detail structure and the functional restriction performed by the forgoing two implementations are further depicted:

The oil storing space is relatively disposed to a radial position of the main oil cylinder of the controller main body. The controller main body has an installation hole, which communicates with the main oil cylinder, disposed to another end of the main oil cylinder that is engaged with the hydraulic pipe. The installation hole is taken as a channel for placing the spring and the piston. A tail seat is disposed to the installation hole of the controller main body. A draw bar passes through a central place of the tail seat to compose a link between the piston and the brake handlebar.

The oil storing space is disposed to the axial position of the main oil cylinder of the controller main body. A sleeve engaged with the main oil cylinder is disposed in the oil storing space of the controller main body to steady the reciprocation motion of the piston. An installation hole communicating with the oil storing space is disposed to another end of the oil storing space that is engaged with the main oil cylinder of the controller main body and taken as a channel for placing the spring, the piston and the sleeve. In addition, a fastening seat is disposed to the installation hole of the controller main body. The fastening seat has a positioning sheath stretching the oil storing space to engage with the sleeve. A draw bar passes through a central place of the positioning sheath to form a link between the piston and the brake handlebar.

A leakage prevention component is disposed between the fastening seat and the controller main body.

A bushing for encapsulating the positioning sheath of the fastening seat and the sleeve is integrally extended from the leakage prevention component.

An inner bump is disposed to a tail of the bushing of the leakage prevention component. A circular groove for wedging the inner bump is circularly disposed to a periphery of the sleeve. A stage for stuffing the sleeve and the bushing is formed at an engaging place between the main oil cylinder and the oil storing space of the controller main body.

The oil storing space is relatively disposed to the radial position of the main oil cylinder. Alternatively, the oil storing space is relatively disposed to the axial position of the main oil cylinder. The axis of the regulating screw is leveled at the axis of the first oil-return hole.

Since the axis of the regulating screw is leveled at the axis of the first oil-return hole, a hand push portion, which is exposed to the controller main body, is further disposed to an end of the regulating screw to allow an operator to conveniently and manually regulate the braking sensitivity.

With the two structural states of relatively disposing the oil storing space at the radial position of the main oil cylinder or relatively disposing the oil storing space at the axial position of the main oil cylinder, the axis of the regulating screw is vertical the axis of the first oil-return hole.

With the arranged structure of allowing the axis of the regulating screw to be vertical the axis of the first oil-return hole, at least one second oil-return hole connecting between the main oil cylinder and the oil storing space is disposed to a screwing place of the regulating screw of the controller main body.

With the arranged structure of allowing the axis of the regulating screw to be vertical the axis of the first oil-return hole, a hand push portion, which is exposed to the controller main body, is further disposed to an end of the regulating screw to allow an operator to conveniently and manually regulate the braking sensitivity.

With the arranged structure of allowing the axis of the regulating screw to be vertical the axis of the first oil-return hole, at least one second oil-return hole connecting between the main oil cylinder and the oil storing space is disposed to a screwing place of the regulating screw of the controller main body. A hand push portion, which is exposed to the controller main body, is further disposed to an end of the regulating screw to allow an operator to conveniently and manually regulate the braking sensitivity.

By comparing with a conventional hydraulic brake controller, under a basis of no influencing the function of automatically filling hydraulic oil for the hydraulic brake controller, the function of regulating the braking sensitivity can be generated by simply rotating the regulating screw. It does not only perfect the structural function of the hydraulic brake controller, but also improves the reliability of the whole brake apparatus.

DETAILED DESCRIPTION OF THE PREFERRED EMBODIMENTS

The foregoing and other technical characteristics of the present invention will become apparent with the detailed description of the preferred embodiments and the illustration of the related drawings.

Figure 1:
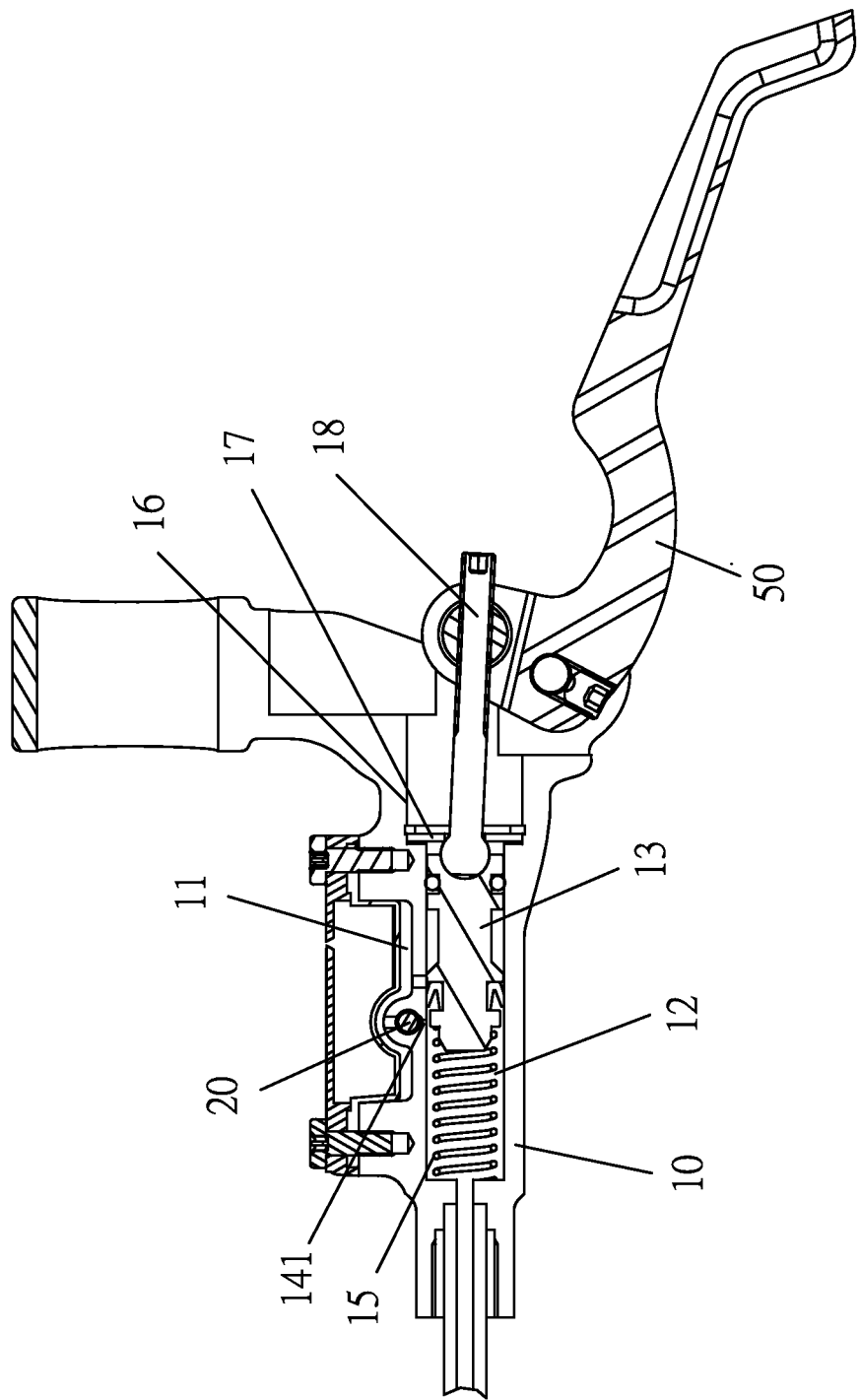
FIG. 1 is a cross-sectional drawing of an axial structure of a hydraulic brake controller according to a first embodiment of the present invention.
Figure 2:
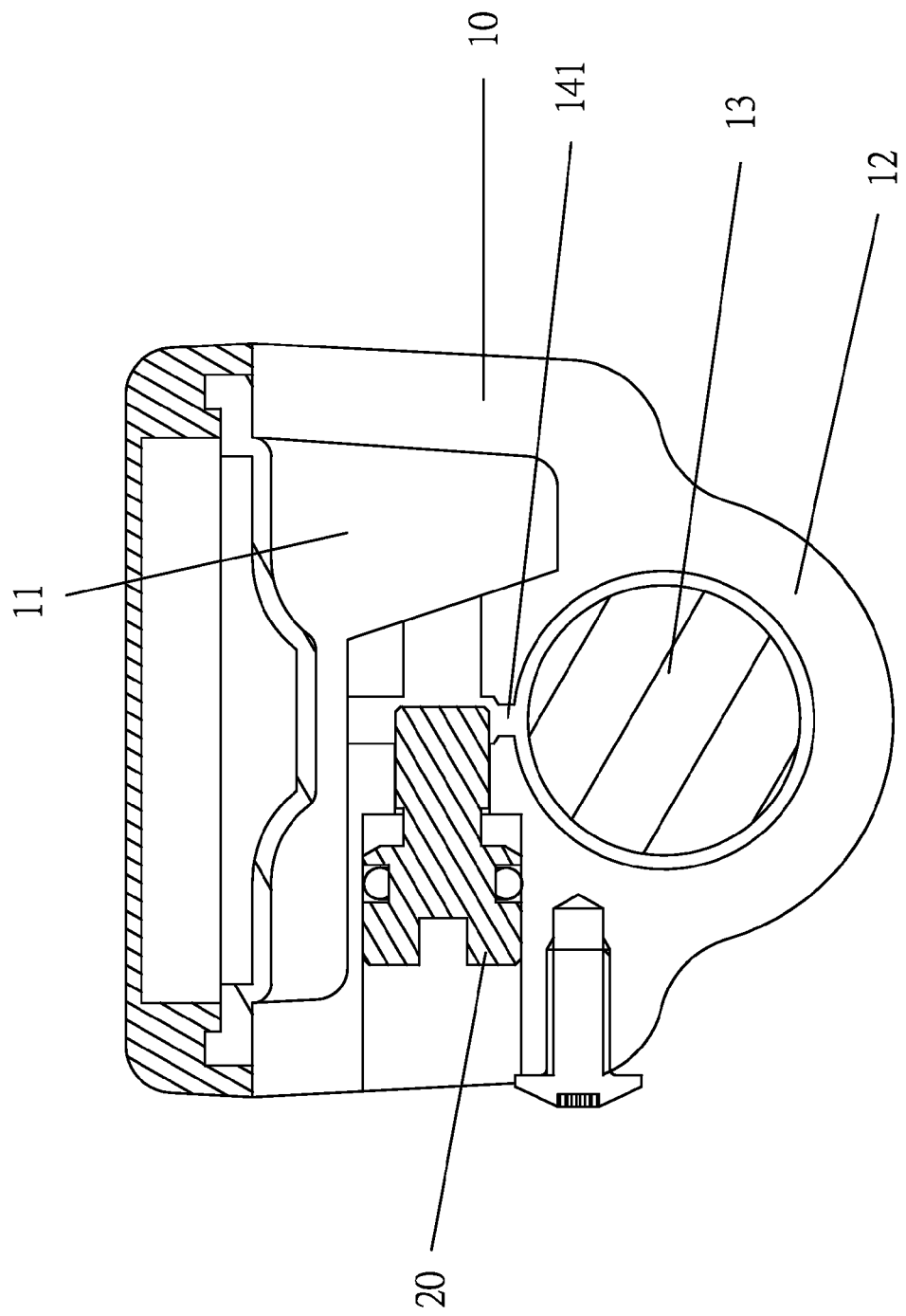
FIG. 2 is a cross-sectional drawing of a radial structure of a hydraulic brake controller according to a first embodiment of the present invention.

With reference to FIG. 1 for a cross-sectional drawing of an axial structure of a hydraulic braking controller in accordance with a first embodiment of the invention and FIG. 2 for a cross-sectional drawing of a radial structure of a hydraulic braking controller in accordance with a first embodiment of the invention are depicted. The hydraulic braking controller of the invention is to dispose an oil storing space 11 for storing hydraulic oil, a main oil cylinder 12 for connecting a sub-oil cylinder of at least one braking caliper (not shown in the figure) through a hydraulic pipe (not shown in the figure) on a controller main body 10. The main oil cylinder 12 further has a piston 13, which is driven by a barking handlebar 50, for relatively reciprocating in the main oil cylinder 12, and the characterized in that:

The controller main body 10 is provided with a first oil-return hole 141, relatively disposed to the stroke place of allowing the piston 13 to reciprocate in the main oil cylinder 12, for connecting the oil storing space 11. A regulating screw 20 capable of passing through the first oil-return hole 141 is further screwed to the controller main body 10.

When the braking controller of the invention is utilized, it is relatively installed to operating handlebars of a motorcycle or a bicycle and then is connected to the brake calipers disposed to wheel hubs through the hydraulic pipe. When a driver presses a brake handlebar, the brake handlebar 50 drives the piston 13 in the main oil cylinder 12 to push the hydraulic oil in the main oil cylinder 12 into the sub-oil cylinder (not shown in the figure) of the brake caliper, thereby braking wheels.

In addition, a spring 15 is disposed between the main oil cylinder 12 and the piston 13 of the controller main body 10 to generate an active force for backing the piston 13 off. When the drive releases the brake handlebar, the piston 13 in the main oil cylinder 12 can step back under an effect of the spring 15, and the brake handlebar 50 returns to a predetermined angle.

After performing a braking motion, the hydraulic pipe in front of the piston 13 is filled with hydraulic oil through the first oil-return hole 141. The piston stroke may not be increased due to the abrasion of the brake pad so that the brake handle grip 30 returns to a predetermined angle, and the braking force can be retained.

Further, the speed of returning hydraulic oil to the oil storing space 11 can be controlled by simply changing the degree that the regulating screw 20 stretching the first oil-return hole 141. The time of allowing the piston 12 passing through the first oil-return hole 141 to completely impose the braking force on the brake pad can be extended or reduced. Alternatively, the goal of conveniently regulating the braking sensitivity can be achieved by regulating the force with respect to the piston 12 in the first oil-return hole 141.

Figure 3:
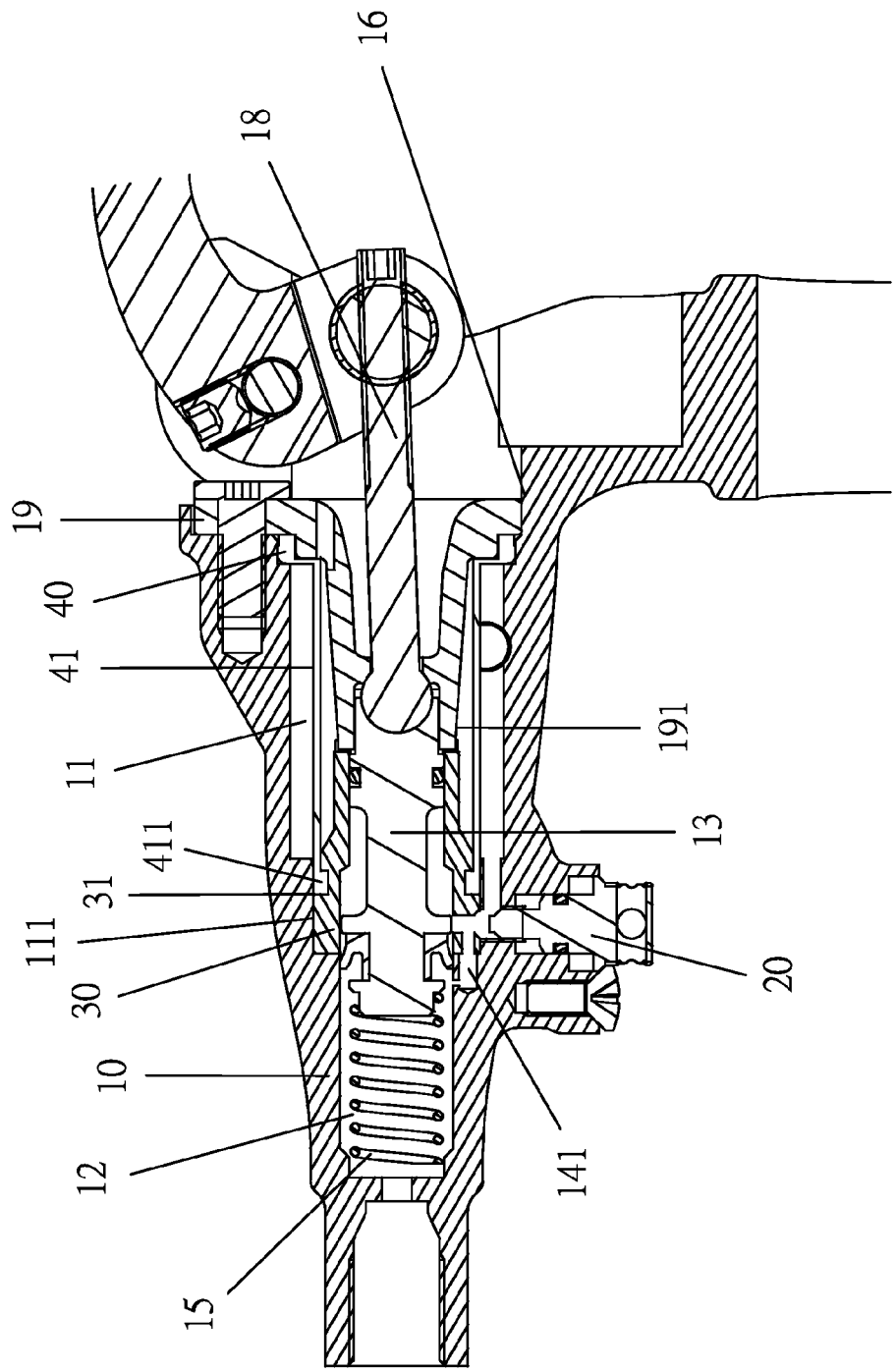
FIG. 3 is a cross-sectional drawing of an axial structure of a hydraulic brake controller according to a second embodiment of the present invention.
Figure 4:
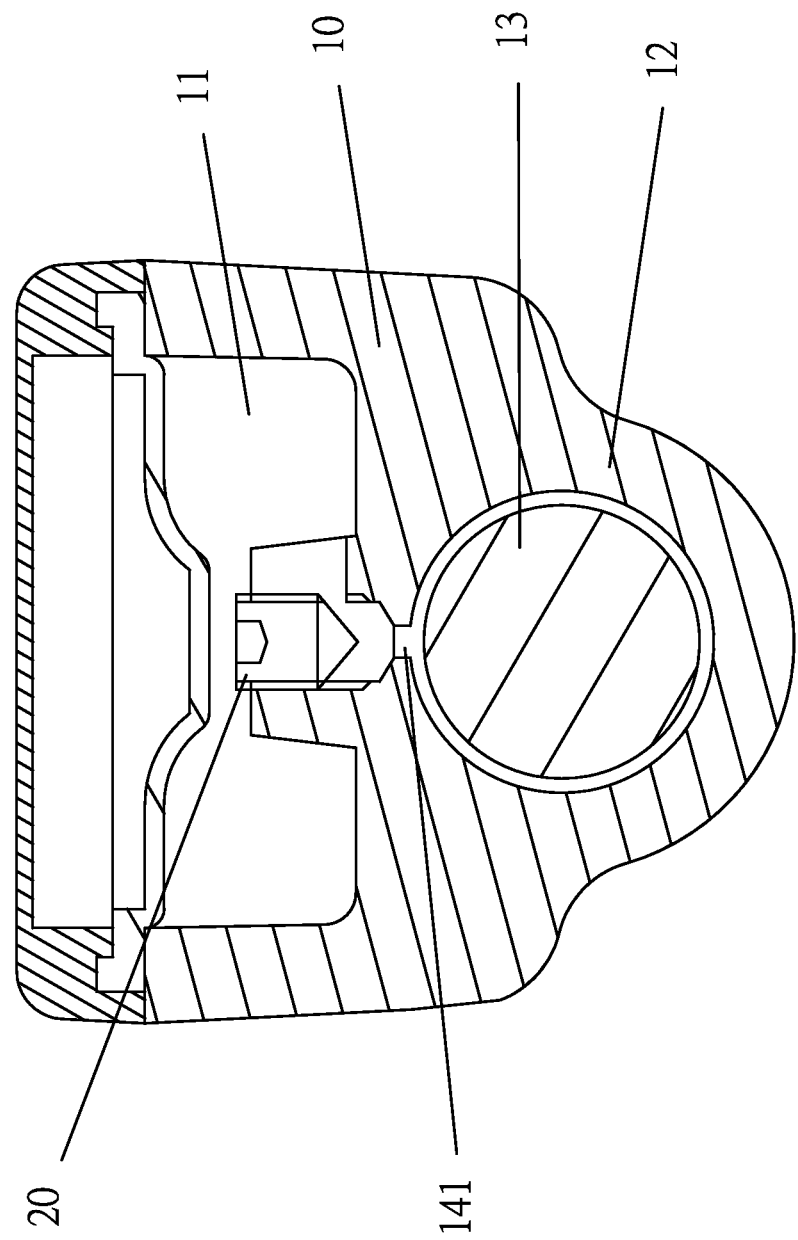
FIG. 4 is a cross-sectional drawing of a radial structure of a hydraulic brake controller according to a third embodiment of the present invention.

When the hydraulic braking controller of the invention is implemented, the oil storing space is relatively disposed to a radial position of the main oil cylinder as shown in FIG. 1. Alternatively, the oil storing space is relatively disposed to the axial direction of the main oil cylinder as shown in FIG. 3 and FIG. 4. The detail structure and function restriction of the foregoing implementations is further depicted:

As shown in FIG. 1, the oil storing space 11 is disposed to the radial position of the main oil cylinder 12 of the controller main body 10. The controller main body 10 has an installation hole 16, which communicates with the main oil cylinder 11, relatively disposed to another end of the main oil cylinder 12 that is engaged with the hydraulic pipe. The installation hole 16 is taken as a channel for placing the spring 15 and the piston 13. A baffle piece 17 is disposed to the installation hole 16 of the controller main body 10. A draw bar 18 passes through a central place of the baffle piece 17 to compose a link between the piston 13 and the brake handlebar 50.

Figure 7:
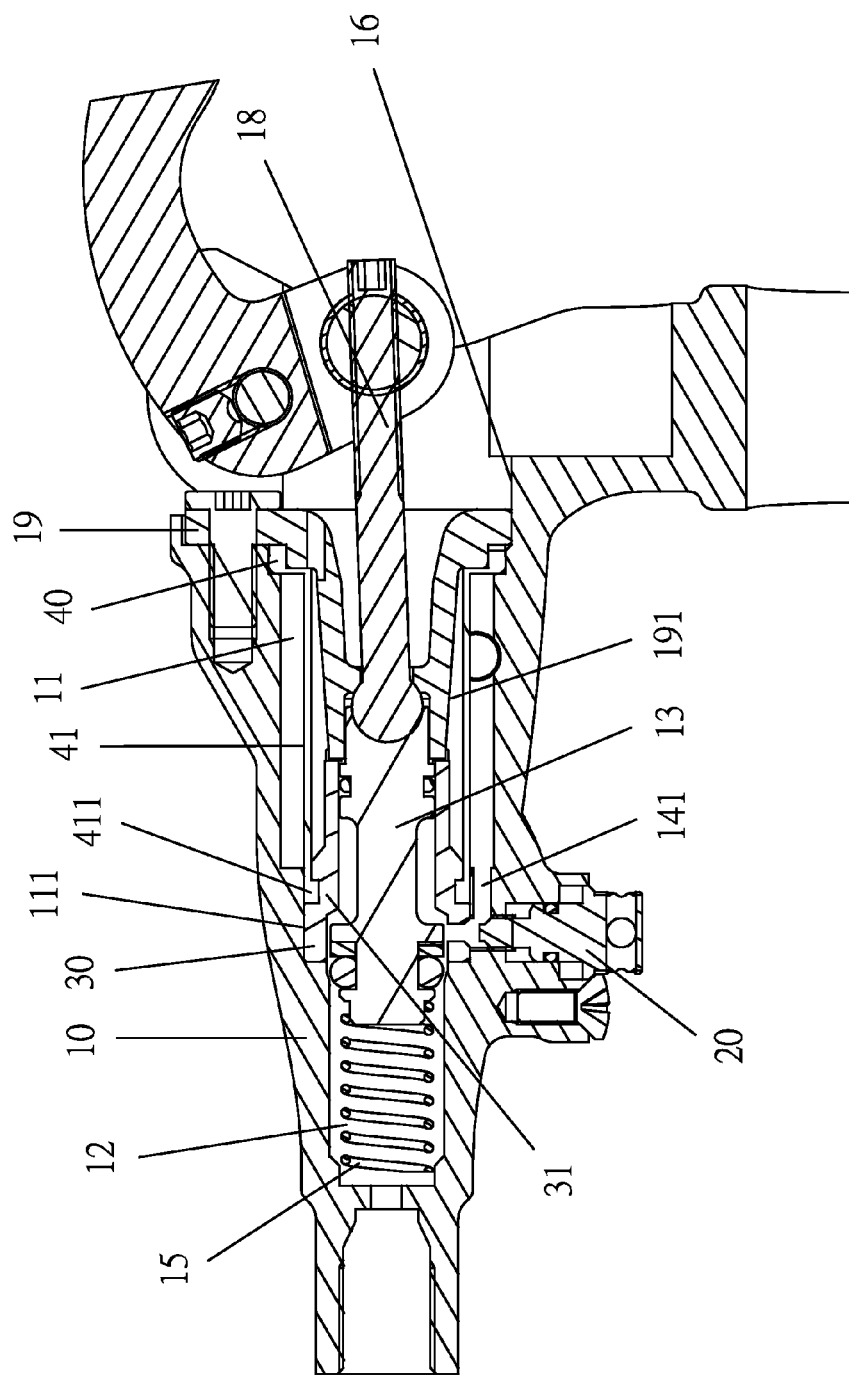
FIG. 7 is a cross-sectional drawing of an axial structure of a hydraulic brake controller according to a sixth embodiment of the present invention.

As shown in FIG. 3 and FIG. 7, the oil storing space 11 is disposed to the axial position of the main oil cylinder 12 of the controller main body 10. A sleeve 30 engaged with the main oil cylinder 11 is further disposed in the oil storing space 11 of the controller main body 10 to steady the reciprocation motion of the piston 13.

The controller main body 10 has an installation hole 16, which communicates with the oil storing space 11, disposed to another end of the oil storing space 11 that is engaged with the main oil cylinder 12. The installation hole 16 is taken as a channel of placing the spring 15, the piston 13 and the sleeve 30. A fastening seat 19 is disposed to the installation hole 16 of the controller main body 10. The fastening seat 19 has a positioning sheath 191 stretching the oil storing space 11 to engage with the sleeve 30. A draw bar 18 passes through a central place of the positioning sheath 191 to form a link between the piston 13 and the brake handlebar 50.

In the embodiment, a leakage prevention component 40 is disposed between the fastening seat 19 and the controller main body 10. A bushing 41 for encapsulating the positioning sheath 191 of the fastening seat 19 and the sleeve 30 is integrally extended from the leakage prevention component 40. An inner bump 411 is disposed to a tail of the bushing 41 of the leakage prevention component 40. A circular groove 31 for wedging the inner bump 411 is circularly disposed to a periphery of the sleeve 30 to exactly connect the bushing 41 and the sleeve 30. A stage 111 for stuffing the sleeve 30 and the bushing 41 is formed at an engaging place between the main oil cylinder 12 and the oil storing space 11 of the controller main body 10 to further enhance the connection effect between the bushing 41 and the sleeve 30.

Moreover, with two structural states of relatively disposing the oil storing space to the radial position of the main oil cylinder or relatively disposing the oil storing space to the axial position of the main oil cylinder, the axis of the regulating screw in the invention can be arranged by leveling at the axis of the first oil-return hole or is vertical the axis of the first oil-return hole.

The implementation of leveling the axis of the regulating screw at the axis of the first oil-return hole or allowing the axis of the regulating screw to be vertical of the axis of the first oil-return hole is further depicted by disposing the oil storing space 11 to the radial position of the main oil cylinder 12 of the controller main body 10 as well as FIG. 1.

As shown in FIG. 4, with the arranged structural state of leveling the axis of the regulating screw at the axis of the first oil-return hole 141, hydraulic oil flowing through the first oil-return hole 141 is limited by the front end of the regulating screw 20 stretching the first oil-return hole 141 so as to achieve the goal of controlling the return speed of hydraulic oil.

As shown in FIG. 2, with the arranged structural state of allowing the axis of the regulating screw 20 to be vertical the axis of the first oil-return hole 141, hydraulic oil flowing through the first oil-return hole 141 is limited by the front end of the regulating screw 20 stretching the first oil-return hole 141 so as to achieve the goal of controlling the return speed of hydraulic oil.

Figure 5:
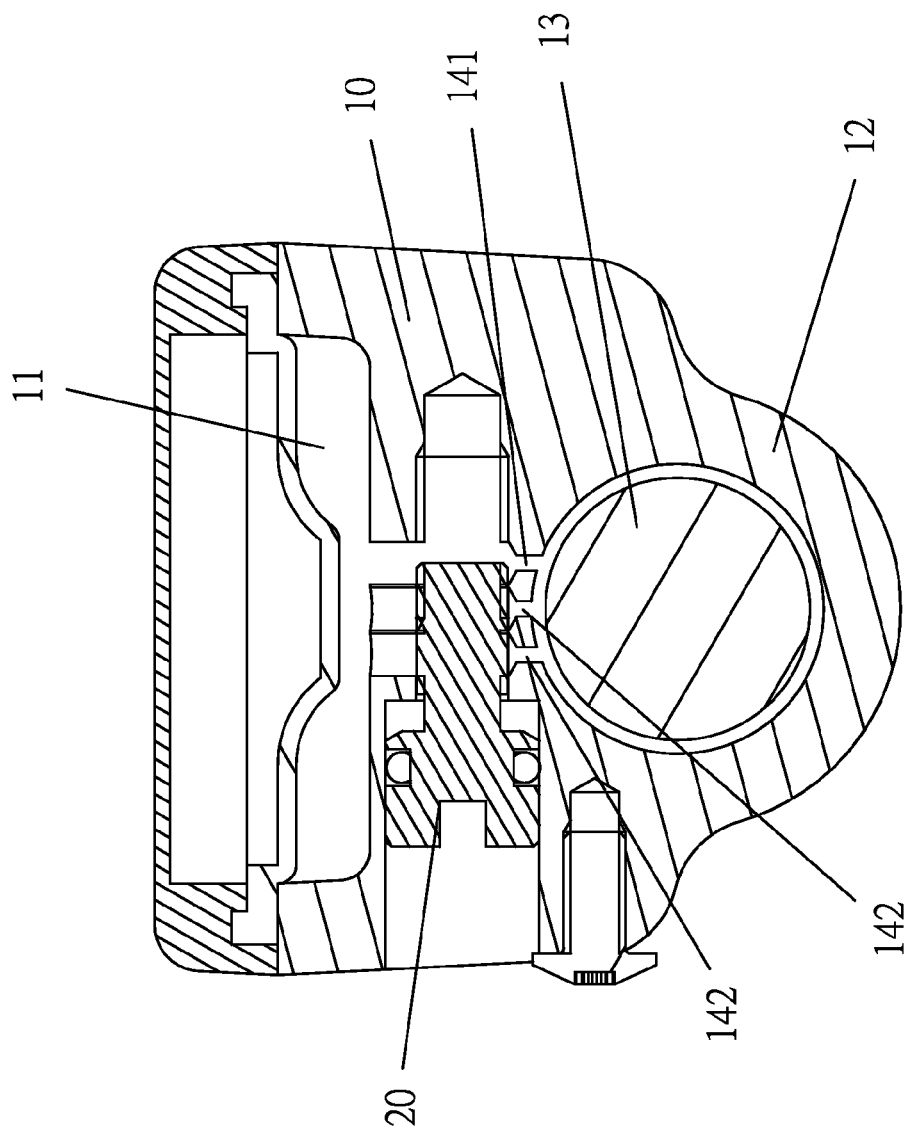
FIG. 5 is a cross-sectional drawing of a radial structure of a hydraulic brake controller according to a fourth embodiment of the present invention.

Further, as shown in FIG. 5, at least one second oil-return hole 142 connecting between the main oil cylinder 12 and the oil storing space 11 is disposed to the screwing place of the regulating screw 20 of the controller main body 10 so that the second oil-return hole 142 is blocked by utilizing the regulating screw 20 to achieve the fine adjustment of the braking sensitivity.

Figure 6:
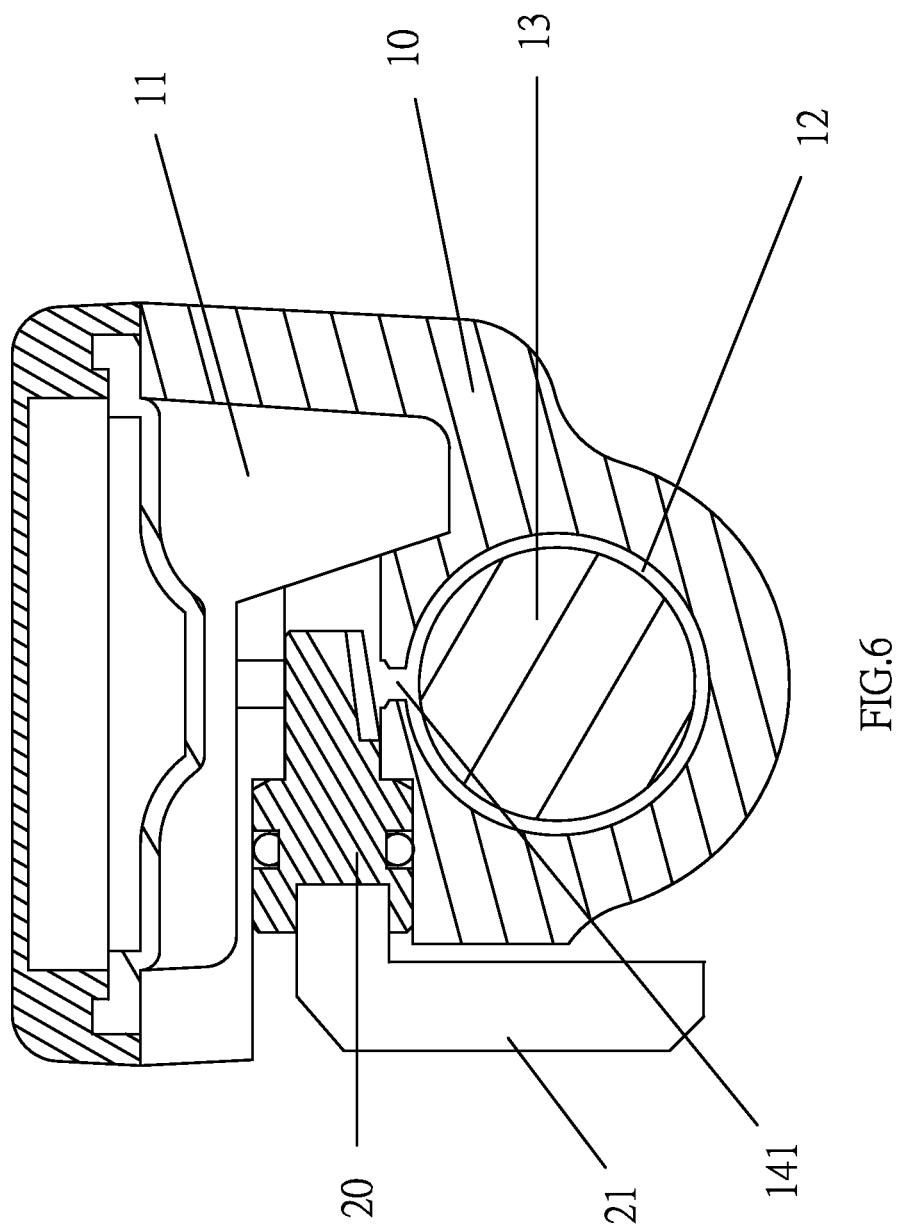
FIG. 6 is a cross-sectional drawing of a radial structure of a hydraulic brake controller according to a fifth embodiment of the present invention.

Of course, when the axis of the regulating screw is vertical the axis of the first oil-return hole or when the axis of the regulating screw is leveled at the axis of the first oil-return hole, as shown in FIG. 6, a hand push portion 21, which is exposed to the controller main body 10, is further disposed to an end of the regulating screw 20. The angle is regulated at the axial place of the regulating screw 20, the oil return capacity is controlled upon the size of the cross-sectional area, and the braking sensitivity is manually regulated by an operator.

By comparing with a conventional hydraulic brake controller, the invention can generate function of regulating the braking sensitivity by simply rotating the regulating screw under the basis of no influencing the function of automatically filling hydraulic oil for the hydraulic brake controller. It does not only perfect the structural function of the hydraulic brake controller, but also improves the reliability of the whole brake apparatus.

The hydraulic brake controller provided by the invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. A hydraulic brake controller having a controller main body, the controller main body comprising:
   an oil storing space for storing hydraulic oil;
   a main oil cylinder provided with a piston driven by a brake handlebar;
   a first oil-return hole connecting the oil storing space to the main oil cylinder and disposed at a stroke place of allowing the piston to reciprocate in the main oil cylinder; and
   a regulating screw screwed to the controller main body and adapted for being releasably inserted into the first oil-return hole, so that the passage of hydraulic oil through the first oil-return hole is adjusted by the extent of insertion of the regulating screw into the first oil-return hole; and
   wherein the oil storing space is disposed axially with respect to the main oil cylinder of the controller main body,
   and a sleeve is engaged with the main oil cylinder disposed within the oil storing space of the controller main body, and the controller main body has an installation hole, which communicates with the oil storing space, disposed to another end of the oil storing space that is engaged with the main oil cylinder, and a fastening seat is disposed to the installation hole of the controller main body, and the fastening seat has a positioning sheath stretching into the controller main body and has an extension portion protruding inwardly to engage with the sleeve to cooperatively define the main oil cylinder, and a draw bar passes through a central portion of the positioning sheath to link the piston and the brake handlebar, and a leakage prevention component for preventing oil leakage from the main oil cylinder is disposed between the fastening seat and the controller main body, and a rigid bushing extending from the leakage prevention component to surround the extension portion of the positioning sheath and the sleeve, so that the bushing and the handlebar base cooperatively define the oil storing space having a fixed volume.

2. The hydraulic brake controller as recited in claim 1, wherein a spring is disposed between the piston and the main oil cylinder of the controller main body.

3. The hydraulic brake controller as recited in claim 1, wherein an axis of the regulating screw is leveled at an axis of the first oil-return hole, and a hand push portion, which is exposed to the controller main body, is disposed to an end of the regulating screw, and a spring is disposed between the piston and the main oil cylinder of the controller main body.

4. The hydraulic brake controller as recited in claim 1, wherein an axis of the regulating screw is vertical to an axis of the first oil-return hole, and a hand push portion, which is exposed to the controller main body, is disposed to an end of the regulating screw, and a spring is disposed between the piston and the main oil cylinder of the controller main body.

5. The hydraulic brake controller as recited in claim 1, wherein an axis of the regulating screw is vertical to an axis of the first oil-return hole, and the controller main body has at least one second oil-return hole connecting between the main oil cylinder and the oil storing space disposed to the screwing place of the regulating screw.

6. The hydraulic brake controller as recited in claim 1, wherein an axis of the regulating screw is vertical to an axis of the first oil-return hole, and a hand push portion, which is exposed to the controller main body, is disposed to an end of the regulating screw, and the controller main body has at least one second oil-return hole connecting between the main oil cylinder and the oil storing space disposed to the screwing place of the regulating screw, and an angle is regulated at an axial place of the screw, and oil return is controlled upon a size of a cross-sectional area.

7. The hydraulic brake controller as recited in claim 1, further comprising an inner bump disposed to a tail of the bushing, and a circular groove for wedging the inner bump circularly disposed to the sleeve.

8. The hydraulic brake controller as recited in claim 1, further comprising a stage formed between the main oil cylinder and the oil storing space of the controller main body and serving to hold the sleeve and the bushing.

* * * * *